March 27, 1956  M. L. BENJAMIN ET AL  2,739,818
CHUCK FOR PISTONS AND THE LIKE
Filed Jan. 17, 1955
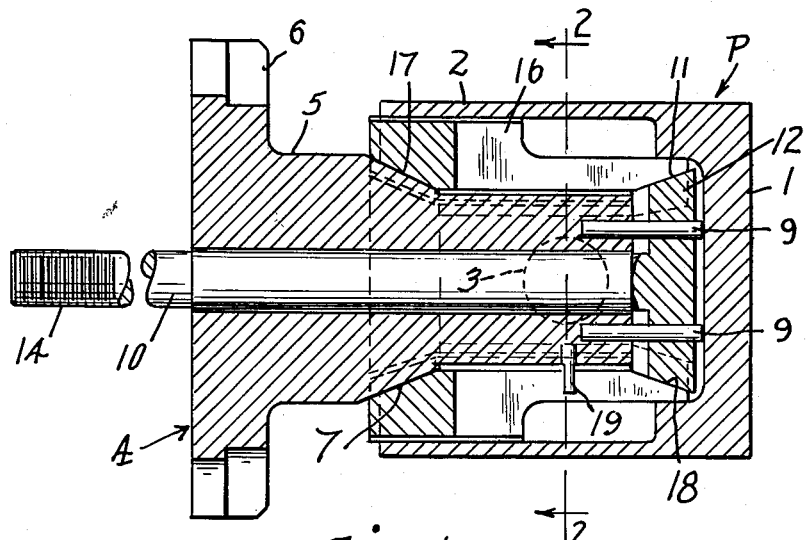
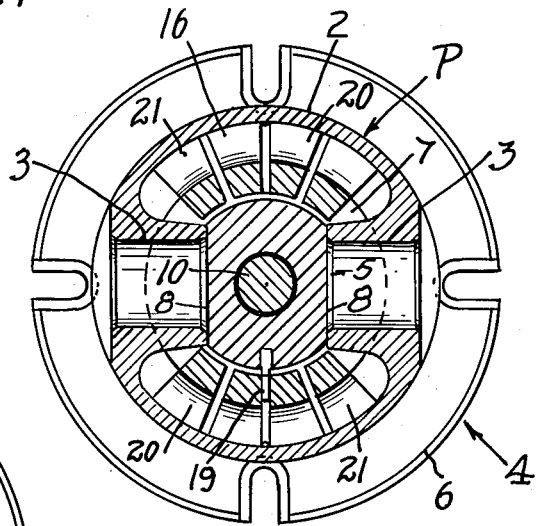
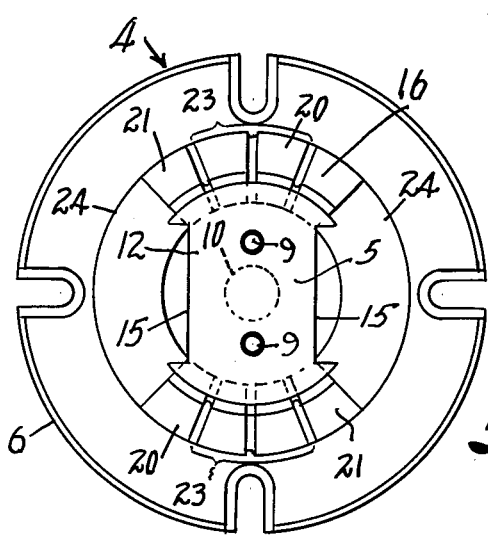
INVENTORS
MILTON L. BENJAMIN +
BY FRANKLYN L. WINNEN
Oberlin + Limbach
ATTORNEYS.

United States Patent Office 2,739,818
Patented Mar. 27, 1956

2,739,818
CHUCK FOR PISTONS AND THE LIKE

Milton L. Benjamin, and Franklyn E. Winnen, Cleveland, Ohio, assignors, by direct and mesne assignments, to Erickson Tool Company, a corporation of Ohio Application January 17, 1955, Serial No. 482,132

10 Claims. (Cl. 279—2)

The present invention relates generally as indicated to a chuck for pistons and the like, and has for one of its principal objects the provision of a chuck which securely and accurately holds a piston thereon for machining operations.

Hitherto, it has been a prevalent practice to provide piston chucks with a pair of radially outwardly movable pins which engage diametrically opposite regions of the inside of the piston skirt, such pins being relied upon to prevent rotation of the piston on the chuck and also to axially position the piston on said chuck, but, as apparent, when gripping pressure is thus applied inside the piston skirt, there is a certain amount of distortion thereof to generally oval form.

As a consequence, after the machining operations have been completed and the piston released from the chuck, the skirt thereof will spring back to its original form, whereby the machined cylindrical exterior surfaces thereof assume an out-of-round condition. Moreover, such radially moving pins do not satisfactorily fulfill the need for an accurate and positive axial stop for the piston.

With the foregoing in mind, it is another object of this invention to provide a piston chuck in which an axially fixed chuck body constitutes an axial positioning stop when a piston is placed thereover and in which said body also non-rotatably fits between the wrist pin bosses of the piston to hold the latter against rotation relative to the chuck body.

Another object of this invention is to provide a piston chuck wherein a radially expansible collet is expanded throughout its length within the piston skirt and engages the inside of the piston skirt along several circumferentially spaced regions so as to reduce to a minimum the distorting force otherwise obtained as by forcing a pair of diametrically opposite pins or shoes radially outward into engagement with the skirt.

Another object of this invention is to provide a piston chuck wherein the aforesaid radially expansible chuck has a gradually releasing grip inside the piston skirt toward the open end of the latter, whereby, again, a rigid support is provided for the piston skirt while distortion of the latter is eliminated.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of a few of the various ways in which the principle of the invention may be employed.

In said annexed drawing:

Fig. 1 is a central longitudinal cross-section view of the present chuck with a piston securely held and accurately positioned thereby;

Fig. 2 is a transverse cross-section view taken substantially along the line 2—2, Fig. 1; and Fig. 3 is an end elevation view, without the piston, as viewed from the righthand end of Fig. 1.

There are, of course, many different varieties of pistons P, but, in essence, each of them includes a head 1, a skirt 2, and a pair of diametrically opposite and coaxial wrist pin bosses 3 which extend radially inwardly from an intermediate section of said skirt. In many instances, pistons of the above type are cast from aluminum or like light metal in permanent molds, and for sake of further reducing the weight thereof, the skirt 2 may be cut away at diametrically opposite regions instead of being square as herein shown. Also, when aluminum or the like is employed for the making of the piston, there may be cast therein steel reinforcing plates, especially around the wrist pin bosses 3, but insofar as the present invention is concerned, the specific details of the piston design are not involved.

In any event, the pistons P as cast require to have the piston head 1 machined to desired thickness and shape, and the exterior of the skirt 2 will have to be accurately formed to the desired diameter and will have to be formed with a series of piston ring grooves adjacent the head 1 thereof. In order to perform these operations on the piston rapidly with heavy cuts, uniformly, and accurately, it is necessary that the chuck on which the piston is supported be capable of securely holding and accurately positioning the piston thereon in an axial direction as well as in coaxial relation with the spindle to which the chuck is mounted.

It is also another requirement that the gripping forces be in no way operative to distort the skirt 2 of the piston or any other part thereof, and yet the piston must be able to be securely held so as not to move from its thus held position during the machining operations performed thereon.

The chuck 4 herein disclosed comprises a chuck body 5 which has a mounting flange 6 by which the same is securely bolted to the machine tool spindle, the forwardly projecting portion of said body being fashioned with an intermediate forwardly tapering frusto-conical surface 7 and an adjacent generally cylindrical portion formed with parallel flats 8, such last portion being adapted to non-rotatably fit between the wrist pin bosses 3 of the piston to thus constitute a non-rotary drive between the chuck body 5 and the piston P.

Projecting forwardly from the end of said chuck body 5 are a pair of parallel cylindrical pins 9 which are adapted to abut the inside of the piston head 1, and because said pins 9 are securely anchored in the chuck body 5, each and every piston P that is placed on the chuck 4 will have its inside piston head surface predeterminedly located with respect to a reference plane of the machine tool.

Extending all the way through the center of the chuck body 5 is a bar 10 which is laterally enlarged at its front end to provide a rearwardly tapered frusto-conical surface 11 axially spaced and oppositely tapered from the frusto-conical surface 7 of said chuck body 5. This enlarged front end of the bar 10, as will be seen later, constitutes a collet actuator 12, and as shown herein, said collet actuator 12 is axially slidably mounted on the forwardly projecting pins 9 of the chuck body 5. The rear end of said bar 10 is formed with threads 14 and suitable operating mechanism (not shown) in threaded engagement with said bar will be effective to alternately draw said bar 10 and actuator 12 rearwardly with respect to the chuck body 5 and to push said bar 10 and actuator 12 forwardly with respect to the chuck body.

Said actuator 12 is formed also with parallel flats 15 so as to clear the wrist pin bosses 3 when a piston P is positioned with its skirt 2 encircling the actuator 12 and the adjacent portion of the chuck body 5.

Surrounding the chuck body 5 is a radially expansible collet 16 which is formed at its opposite ends with oppositely tapered frusto-conical surfaces 17 and 18 that are respectively complementary with the frusto-conical surfaces 7 and 11 of said chuck body 5 and of said actuator 12. Said collet 16 is alternately slotted from its opposite ends so as to provide series of circumferentially adjacent jaws adapted to frictionally engage the inside of the piston skirt 2 when said collet 16 is radially expanded. Said collet 16 is also diametrically slotted from the front end toward the rear end so as to clear the wrist pin bosses 3, and for the purpose of preventing rotation of the collet 16 on the chuck body 5, the latter is provided with a radially extending pin 19 which loosely fits in one of the slots of the collet.

As is best shown in Figs. 2 and 3, the front portion of the collet comprises two pairs of diametrically opposite jaws 20 and 21 which, when moved radially outwardly, are adapted to engage the thickened portion of the piston skirt 2 at two pairs of circumferentially spaced apart regions, whereby very tight gripping of the piston may be effected without distorting said skirt.

On the other hand, the rear end of said collet 16 is in the form of a slotted annulus which provides one pair of relatively narrow diametrically opposite jaws 23, each of which is of approximately 45° extent, and another pair of relatively wide diametrically opposed intervening jaws 24, each of approximately 135° extent, and thus the frail end portion of the skirt 2 of the piston P will be uniformly supported around its entire circumference and will not be distorted to out-of-round section.

The tapers of the frusto-conical surfaces 7 and 11 are preferably such that the piston skirt 2 is gripped with a gradually releasing pressure toward the rear end and with less pressure at the rear end than at the front end. This may be accomplished by making taper of surface 7 greater than that of surface 11, whereby the radial force at the rear end of collet 16 will be less than at the front end.

As can now be seen, when the actuator 12 is in its forward position, the collet 16 will be in its radially contracted condition due to its resilient construction. The operator now places the piston P to be machined over the collet 16 and moves the piston axially until the inside of the piston head 1 abuts firmly the ends of the chuck body pins 9.

Next, the bar 10 is drawn toward the rear, and the consequent rearward axial movement of the actuator 12 expands the collet through the wedging action obtained between the frusto-conical surfaces 11 and 18, and the axial force component resulting from such coaction results in a slight rearward movement of the collet 16, whereby the coaction of the frusto-conical surfaces 7 and 17 at the rear effect radial expansion of the collet 16 but with less radial force for the reasons aforesaid.

It is to be noted that the slight rearward movement of the collet 16 with respect to the chuck body 5 as just explained tends to tightly pull the piston P engaged thereby toward the rear to maintain a solid, tight engagement between the piston head 1 and the aforesaid pins 9.

With the piston P thus securely held on the chuck 4 in both axial and lateral position, the machining operations may be performed thereon without danger of slipping of the piston P either axially or laterally. After the desired machining operations have been completed on the piston P, the tension on the draw bar 10 will be released or else the draw bar will be moved forwardly, and, as a result, the collet 16 will, by reason of the resilience of the jaws thereof, assume its normal, unexpanded condition so that the finished piston P may be axially withdrawn. The operator may then load the next piston P on the chuck and repeat the operations aforesaid.

Other modes of applying the principle of the invention may be employed, change being made as regards the details described, provided the features stated in any of the following claims, or the equivalent of such, be employed.

We therefore particularly point out and distinctly claim as our invention:

1. In a chuck for holding and positioning thereon an automotive and like piston of the type having a head, a skirt, and coaxial wrist pin bosses extending radially inwardly from the skirt thereof, the combination of a chuck body formed to non-rotatably fit between the wrist pin bosses of such piston and to abut the inside of the piston head, a collet actuator axially reciprocably carried by said body, and a radially expansible collet operatively engaged between said body and said actuator whereby axial movement of the latter in one direction radially expands said collet into engagement with the surrounding skirt of the piston.

2. In a chuck for holding and positioning thereon an automotive and like piston of the type having a head, a skirt, and coaxial wrist pin bosses extending radially inwardly from the skirt thereof, the combination of a chuck body formed to non-rotatably fit between the wrist pin bosses of such piston and to abut the inside of the piston head, a collet actuator axially reciprocably carried by said body, and a radially expansible collet operatively engaged between said body and said actuator whereby axial movement of the latter in one direction radially expands said collet into engagement with the surrounding skirt of the piston, said body and actuator and the opposite end portions of said collet being formed with interengaging wedge surfaces effective upon such axial movement of said actuator to exert expansive influence on both ends of said collet.

3. In a chuck for holding and positioning thereon an automotive and like piston of the type having a head, a skirt, and coaxial wrist pin bosses extending radially inwardly from the skirt thereof, the combination of a chuck body formed to non-rotatably fit between the wrist pin bosses of such piston and to abut the inside of the piston head, a collet actuator axially reciprocably carried by said body, and a radially expansible collet operatively engaged between said body and said actuator whereby axial movement of the latter in one direction radially expands said collet into engagement with the surrounding skirt of the piston, said collet being of generally tubular form and being slotted from one end toward the other to clear the wrist pin bosses of the piston.

4. In a chuck for holding and positioning thereon an automotive and like piston of the type having a head, a skirt, and coaxial wrist pin bosses extending radially inwardly from the skirt thereof, the combination of a chuck body formed to non-rotatably fit between the wrist pin bosses of such piston and to abut the inside of the piston head, a collet actuator axially reciprocably carried by said body, and a radially expansible collet operatively engaged between said body and said actuator whereby axial movement of the latter in one direction radially expands said collet into engagement with the surrounding skirt of the piston, said collet being of generally tubular form alternately slotted from its opposite ends to render the same radially expansible throughout its length, and being additionally slotted from one end toward the other to clear the wrist pin bosses of the piston.

5. In a chuck for holding and positioning thereon an automotive and like piston of the type having a head, a skirt, and coaxial wrist pin bosses extending radially inwardly from the skirt thereof, the combination of a chuck body formed to non-rotatably fit between the wrist pin bosses of such piston and to abut the inside of the piston head, a collet actuator axially reciprocably carried by said body, and a radially expansible collet operatively engaged between said body and said actuator whereby axial movement of the latter in one direction radially expands said collet into engagement with the surrounding skirt of the piston, said body and actuator and the opposite end portions of said collet being formed with interengaging wedge surfaces effective upon such axial movement of said actuator to exert expansive influence on both ends of said collet, the interengaging wedge surfaces between said body and one end of said collet and between said actuator and the other end of said collet being of different relative inclination to effect greater expansive force on the collet end portion which engages the skirt adjacent the piston head than on the other collet end portion which engages the skirt at the end remote from the piston head.

6. In a chuck for holding and positioning thereon an automotive and like piston of the type having a head, a skirt, and coaxial wrist pin bosses extending radially inwardly from the skirt thereof, the combination of a chuck body formed to non-rotatably fit between the wrist pin bosses of such piston and to abut the inside of the piston head, a collet actuator axially reciprocably carried by said body, and a radially expansible collet operatively engaged between said body and said actuator whereby axial movement of the latter in one direction radially expands said collet into engagement with the surrounding skirt of the piston, said collet being formed with oppositely tapered frusto-conical surfaces at its ends, and said body and said actuator each being formed with a frusto-conical surface which is complementary with the frusto-conical surface at the corresponding end of said collet.

7. In a chuck for holding and positioning thereon an automotive and like piston of the type having a head, a skirt, and coaxial wrist pin bosses extending radially inwardly from the skirt thereof, the combination of a chuck body formed to non-rotatably fit between the wrist pin bosses of such piston and to abut the inside of the piston head, a collet actuator axially reciprocably carried by said body, and a radially expansible collet operatively engaged between said body and said actuator whereby axial movement of the latter in one direction radially expands said collet into engagement with the surrounding skirt of the piston, said body having at least one axially extending pin fixed thereto which projects through said actuator and against the end of which the piston head is adapted to be abutted, said pin thus constituting a positioning stop for predeterminedly axially positioning a piston with respect to said body.

8. In a chuck for holding and positioning thereon an automotive and like piston of the type having a head, a skirt, and coaxial wrist pin bosses extending radially inwardly from the skirt thereof, the combination of a chuck body having a rear base portion adapted to be secured to a machine tool spindle, and a coaxial forwardly projecting portion including a forwardly tapered frusto-conical surface, an adjacent cylindrical portion having parallel flats adapted to non-rotatably fit between the wrist pin bosses of such piston, and forwardly projecting pins adapted to abut the inside of the piston head, a collet actuator axially slidable on said pins and formed with a rearwardly tapered frusto-conical surface, a bar secured at one end to said actuator and extending rearwardly through said body for effecting movement of said actuator, and a radially expansible collet adapted to frictionally engage the piston skirt therearound, said collet having its opposite ends engaged with such frusto-conical surfaces whereby rearward movement of said actuator effects radial expansion of said collet.

9. In a chuck for holding and positioning thereon an automotive and like piston of the type having a head, a skirt, and coaxial wrist pin bosses extending radially inwardly from the skirt thereof, the combination of a chuck body having a rear base portion adapted to be secured to a machine tool spindle, and a coaxial forwardly projecting portion including a forwardly tapered frusto-conical surface, an adjacent cylindrical portion having parallel flats adapted to non-rotatably fit between the wrist pin bosses of such piston, and forwardly projecting pins adapted to abut the inside of the piston head, a collet actuator axially slidable on said pins and formed with a rearwardly tapered frusto-conical surface, a bar secured at one end to said actuator and extending rearwardly through said body for effecting movement of said actuator, and a radially expansible collet adapted to frictionally engage the piston skirt therearound, said collet having its opposite ends engaged with such frusto-conical surfaces whereby rearward movement of said actuator effects radial expansion of said collet, said collet being slotted rearwardly from the actuator-engaged end thereof to clear such wrist pin bosses.

10. In a chuck for holding and positioning thereon an automotive and like piston of the type having a head, a skirt, and coaxial wrist pin bosses extending radially inwardly from the skirt thereof, the combination of a chuck body having a rear base portion adapted to be secured to a machine tool spindle, and a coaxial forwardly projecting portion including a forwardly tapered frusto-conical surface, an adjacent cylindrical portion having parallel flats adapted to non-rotatably fit between the wrist pin bosses of such piston, and forwardly projecting pins adapted to abut the inside of the piston head, a collet actuator axially slidable on said pins and formed with a rearwardly tapered frusto-conical surface, a bar secured at one end to said actuator and extending rearwardly through said body for effective movement of said actuator, and a radially expansible collet adapted to frictionally engage the piston skirt therearound, said collet having its opposite ends engaged with such frusto-conical surfaces whereby rearward movement of said actuator effects radial expansion of said collet, said collet being axially slotted alternately from its opposite ends to provide at each end a plurality of arcuate jaws adapted to engage the piston skirt along several circumferentially spaced regions thereof to constitute a rigid support retaining the skirt in cylindrical form when thus held by the chuck.

No references cited.